March 15, 1932. E. M. WHEELOCK 1,849,470
AUTOMOBILE STORAGE BUILDING
Original Filed Feb. 27, 1926 4 Sheets-Sheet 1

Inventor:
E. M. Wheelock.
By Whiteley and Ruckman
Attorneys.

March 15, 1932. E. M. WHEELOCK 1,849,470
AUTOMOBILE STORAGE BUILDING
Original Filed Feb. 27, 1926  4 Sheets-Sheet 3

Inventor:
E. M. Wheelock.
By Whiteley and Ruckman
Attorneys.

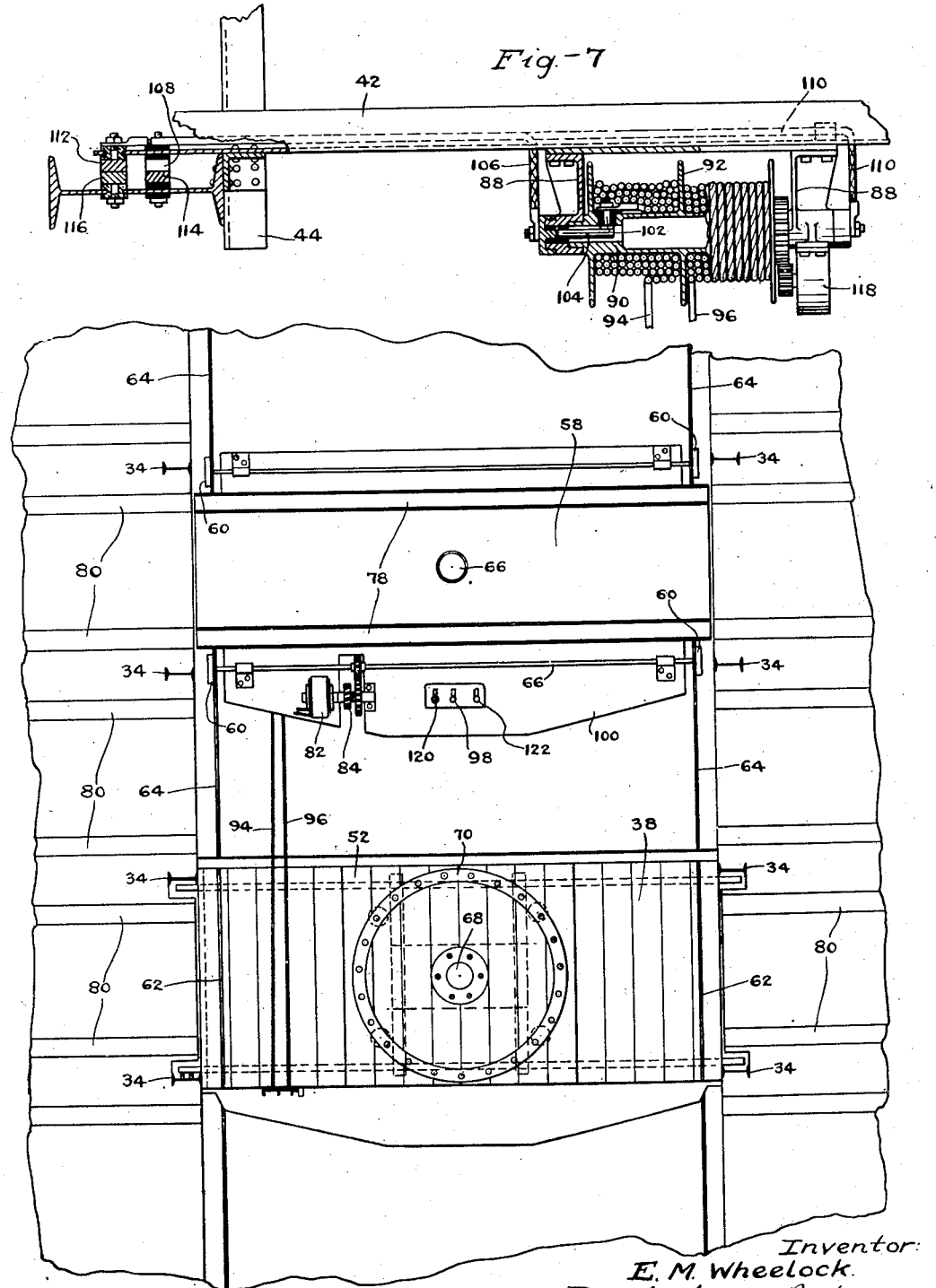

Patented Mar. 15, 1932

1,849,470

UNITED STATES PATENT OFFICE

EDWIN M. WHEELOCK, OF MILLER, SOUTH DAKOTA, ASSIGNOR TO KENT GARAGE INVESTING CORPORATION, OF NEW YORK, N. Y., A CORPORATION OF DELAWARE

AUTOMOBILE STORAGE BUILDING

Application filed February 27, 1926, Serial No. 91,080. Renewed January 7, 1931.

My invention relates to automobile storage buildings and an object in general is to provide a building of this character in which automobiles may be compactly and expeditiously stored, and from which they may be readily removed when the drivers thereof desire to take them out. The constantly increasing number of automobiles in use in large cities have made it necessary to provide traffic regulations which either entirely prohibit the parking of automobiles in the streets of congested sections, or so limit the time allowed for parking that automobile owners whose business requires their presence in the city for the greater part of the day are either compelled to leave their automobiles at places remote from their places of business or to refrain from driving their automobiles as a means of reaching and departing from their places of business. There are frequently places even in congested portions of a city having considerable ground in the rear of buildings occupying valuable frontage where automobiles could be stored if a suitable building were provided upon such unoccupied rear spaces. An object, therefore, in particular of my invention is to provide a storage building for such unoccupied pieces of ground where automobiles may be stored without interfering materially with the use of the valuable frontage for ordinary business purposes.

The full objects and advantages of my invention will appear in connection with the detailed description thereof, and the novel features of my inventive idea will be particularly pointed out in the claims.

In the accompanying drawings which illustrate one form in which my invention may be embodied,—

Figure 1:
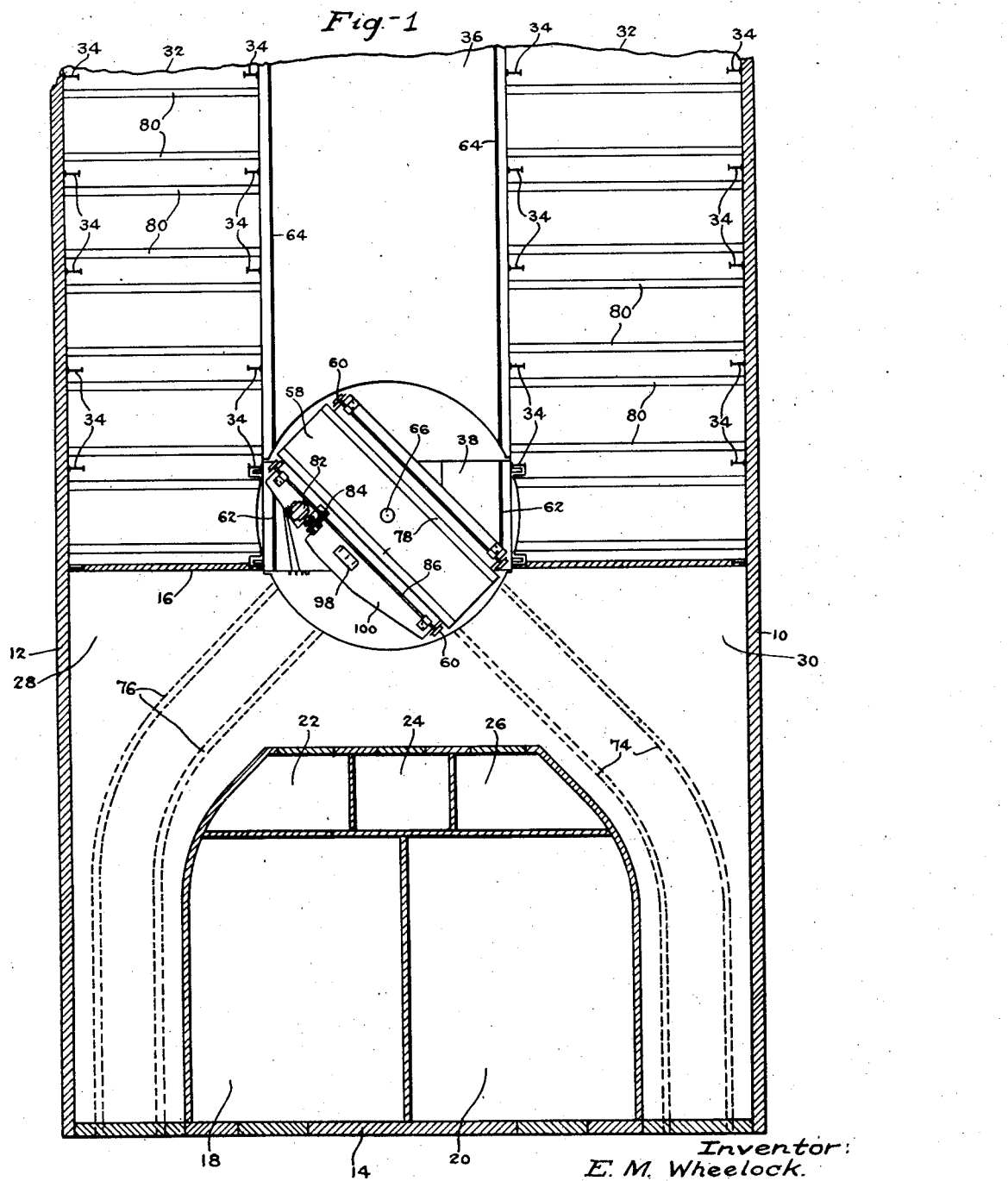
Figure 2:
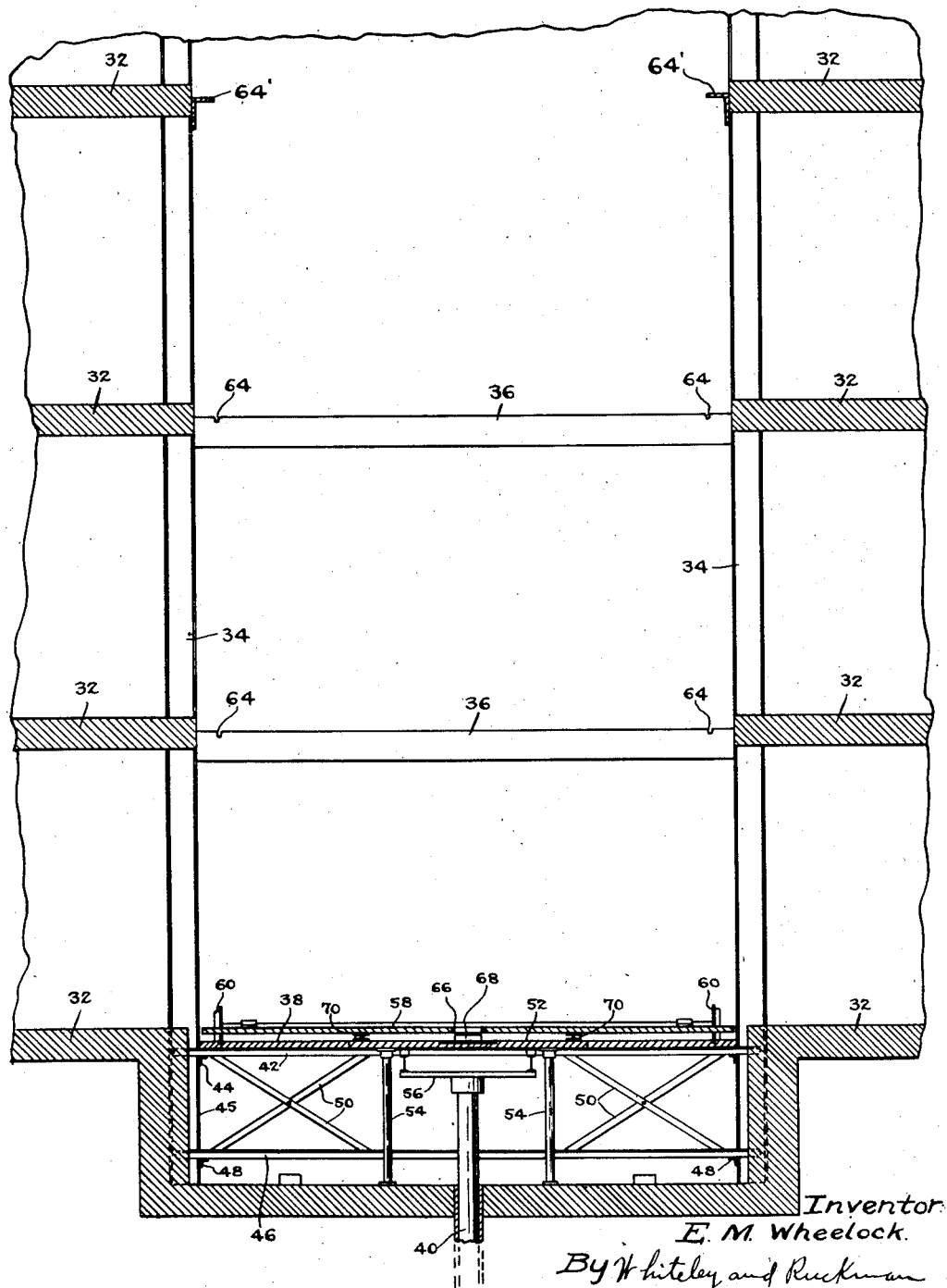
Figure 3:
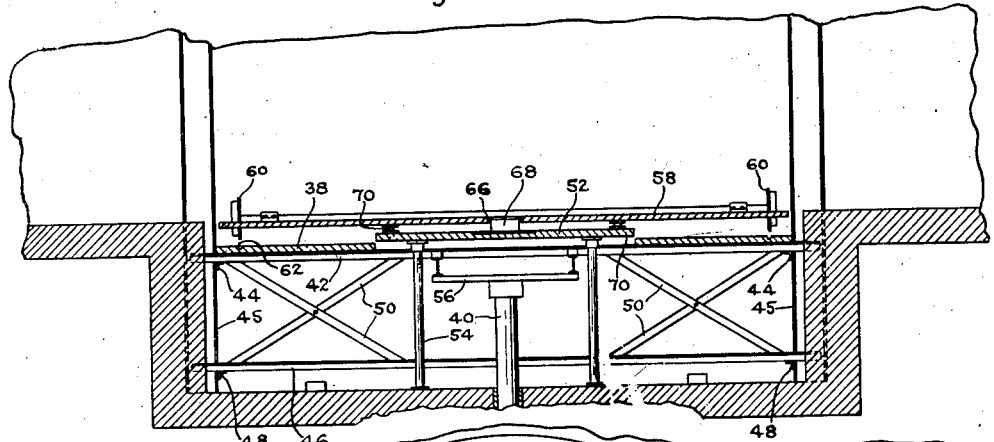
Figure 4:
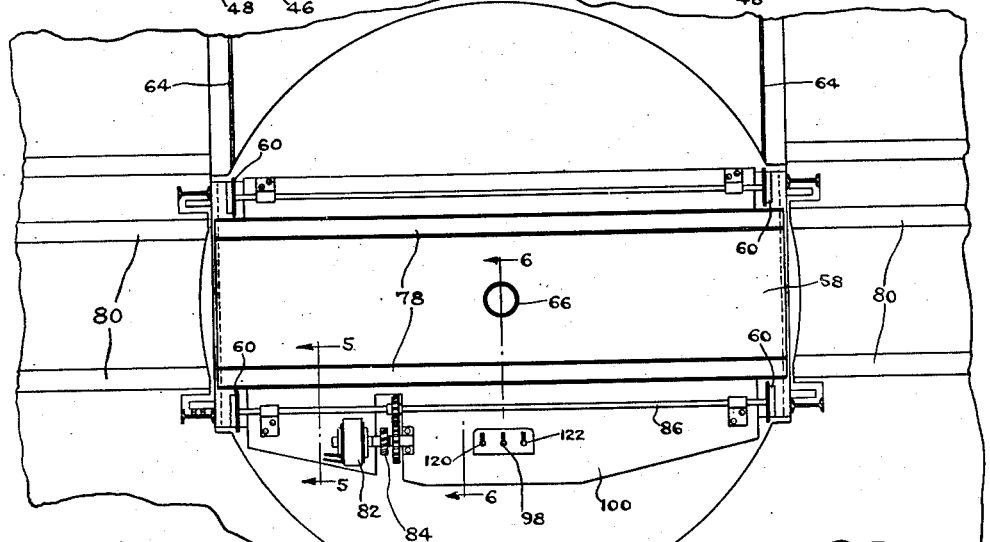
Figure 5:
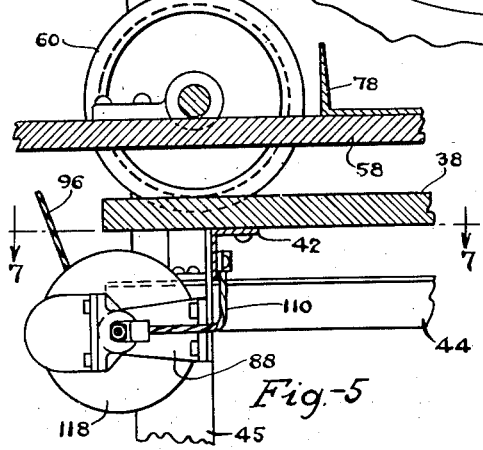
Figure 6:
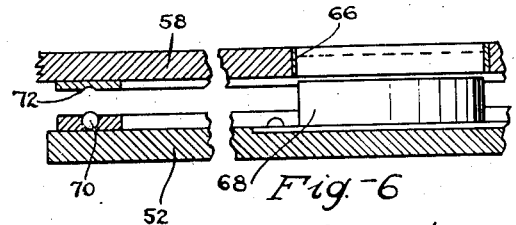

Fig. 1 is a plan view of the lower floor of a building. Fig. 2 is a view in vertical section showing a truck for carrying automobiles in position on an elevator. Fig. 3 is a view similar to the lower portion of Fig. 2 but showing the elevator dropped to a slightly lower position while the truck is restrained from further downward movement. Fig. 4 is a plan view showing the truck on the elevator. Fig. 5 is a view in section on the line 5—5 of Fig. 4. Fig. 6 is a view in section on the line 6—6 of Fig. 4. Fig. 7 is a detail sectional view of a winding drum and elevator contacts. Fig. 8 is a plan view of an upper floor of the building showing the truck run off the elevator.

Referring to the construction shown in the drawings, and first, more particularly to Fig. 1, the numerals 10 and 12 designate in general the side walls of a building having a front wall 14 provided with entrances from the street. The front portion of the building is separated from the rear or storage portion by a partition wall 16 having an opening therein for a purpose which will be explained later. The front portion of the building is intended for business purposes such as stores and for illustration may be considered as comprising a grocery 18, a meat market 20, a ladies' waiting room 22, a checkroom 24, a mens' waiting room 26, a room 28 for tires, and a room 30 for oils. Back of the partition 16 is the storage portion of the building which has its side walls formed as continuations of the side walls of the front portion and which may be built up to any desired or permissible height. This portion of the building is provided with a plurality of floors indicated at 32 which may be of cement or any other suitable material and supported by vertically disposed I-beams 34. As will be apparent from Fig. 1, the verticals 34 are arranged in properly spaced relation not only along the side walls but also along the sides of a centrally disposed alley-way having floor sections 36 which are located at slightly lower levels than the floors 32 at the sides thereof. At the opening in the partition 16, there is an elevator having a platform 38 whose front side, as shown in Fig. 1, is substantially in alinement with the partition 16 so that the elevator is located just to the rear of this partition. The elevator may be of any suitable type and, as illustrated, is hydraulic and adapted to be operated by a plunger 40 in the usual manner. The elevator platform 38 is supported upon angle beams 42 which rest upon and are secured to cross beams 44 whereby an upper frame is formed which is connected by vertical members 45 to a lower frame consisting of beams 46 and cross beams 48, the two frames being also connected together by cross braces 50. The platform 38 has a middle portion 52 which is slidable vertically with relation to the main portion of the platform so that when the elevator descends to its lowermost position in the pit, the middle portion will be lifted with relation to the main portion from the position shown in Fig. 2 into that shown in Fig. 3 on account of striking the upper ends of a number of posts 54 which are placed in the pit. The upper end of the plunger 40 is secured to the frame of the elevator by a framelike construction 56 which permits the vertical movement of the platform section 52. A truck having a platform 58 is mounted on wheels 60 and is adapted to cooperate both with the elevator and with the alleyways. In the particular embodiment shown, the wheels 60 are adapted to run in grooves 62 in the elevator platform 38 and in grooves 64 in the floor sections 36. The truck platform 58 is provided with a central circular aperture 66 which receives a cylindrical projection 68 carried by the elevator section 52 when the latter is in the position shown in Fig. 3. The elevator section 52 carries a circular row of ball bearings 70 which fit into a circular groove 72 when the platform section 52 is above the main portion of the platform. The groove 72 is formed in a ring secured to the lower surface of the platform 58 as best shown in Fig. 6. When the truck is held up in the manner just described, it may be readily turned since the wheels 60 are now out of the grooves 62. The reason for turning the truck will be understood from Fig. 1 which represents the ground floor and upon which dotted lines 74 indicate the path of an entering automobile while dotted lines 76 indicate the path of a departing automobile. When the truck is turned into the position shown in this Figure, the entering automobile may be readily run thereon, the truck platform having guide rails or tracks 78 for the wheels of the automobile. It will be apparent from Fig. 3 that the truck platform when restrained from further downward movement is level with the main floor of the building. In case the path of the entering automobile were directly in front of the elevator, then the truck would be turned through ninety degrees instead of forty-five degrees as shown, while if the automobile entered through the side of the building directly opposite the elevator, then it would not be necessary to turn the truck for receiving the automobile. For other positions, however, other than that last mentioned, when the automobile is in position on the truck, it is necessary to turn the latter back so that the wheels 60 will be directly above the grooves 62, and then upon lifting the elevator the truck wheels will fit into the grooves 62. When the elevator has been raised to the desired floor, it is stopped and the truck is run off into the alleyway as seen in Fig. 8, the wheels 60 running in the grooves 64 as guides. The floors 32 at each side of the alleyway are provided with a plurality of stalls arranged between the verticals 34 and having tracks or groves 80 which aline with the tracks or guide rails 78 on the truck when the latter is moved into proper position. These two sets of tracks are at the same height due to the fact that the grooves or tracks of the alleyway which receive the wheels of the truck are lower than the tracks or grooves of the floors 32. As shown in Fig. 2, the upper alleyway, instead of being provided with a solid floor, is provided with rails 64' secured to the verticals 34. These rails correspond to the grooves or tracks 64 since they are so positioned that the tracks on the truck on the floors 32 will be in alinement when the truck is moved horizontally into the proper position. It is, of course, obvious that other alleyways may be provided with tracks 64' instead of solid floors. In order to speed up the operation of the truck along the alleyways, it is desirable to operate it by power and this may be done in the following manner. An electric motor 82 mounted on the truck has its shaft connected by suitable gearing 84 with a shaft 86 to which two wheels of the truck are secured. Special means are preferably provided for supplying the motor with current since an ordinary trolly arrangement would be difficult of employment on account of the fact that the truck must be capable of operation at different heights corresponding to the different floors. Secured to the elevator by brackets 88 there is a drum 90 as shown in Fig. 7 having a central flange 92 which separates it into two parts. A cable or insulated wire 94 is arranged to wind on one portion of this drum with the outer end of the cable connected with one terminal of the motor 82. A cable or insulated wire 96 is arranged to wind on the other portion of the drum with the outer end thereof connected with a switch 98 placed on a platform 100 upon which the operator may stand. This switch is connected with the other terminal of the motor and while the switch construction constitutes no part of my invention, nevertheless it is to be understood that provision is made whereby the direction of the motor may be reversed. The inner end of the wire 94 which winds on the drum is secured to a contact pin 102 insulatively mounted in the cylindrical core of the drum and adapted to move in contact with the inner end of a fixed rod 104 insulatively mounted in the bracket which supports the drum. The rod 104 is connected by a wire 106 with a contact block 108 insulatively supported near one corner of the elevator. The inner end of the wire 96 which winds on the drum is in similar manner connected with a wire 110 which leads to a contact block 112 insulatively supported adjacent the contact block 108. The blocks 108 and 112 have a wiping or sliding contact respectively with vertical conducting strips 114 and 116 which are fastened by insulating blocks to the vertical 34 which is adjacent this corner of the elevator, it being understood that the strips 114 and 116 are connected with a source of electrical energy so that they constitute a lead and return. A spring mechanism 118 is connected with the drum so as to keep the wires 94 and 96 wound up thereon to prevent slack and at the same time permit the truck to run on anyone of the alleyways toward and away from the elevators. A device 120 is shown adjacent the switch 98 for controlling the up and down movement of the elevator and another device 122 is also shown for causing the truck to be rotated when it is in the position shown in Fig. 3. The devices 120 and 122 constitute no part of the present invention and, hence, are not described in detail. It is obvious that guide rails for the wheels of the truck may be employed in place of the grooves 62 and 64.

The operation and advantages of my invention will be understood in connection with the foregoing description. Automobiles which are to be stored in the building enter through a doorway on the ground floor and are placed on the truck when the latter is lifted with relation to the elevator as shown in Fig. 3 so that the truck may be turned to take the automobile as shown in Fig. 1 which is the loading position. It will be understood that for unloading purposes, the truck may be turned so that the automobile will be taken off in the path indicated by the dotted lines 76 and it will be apparent that this will cause the automobile to move off front first. The circular space in the floor around the elevator permits the truck to be turned without interference from the floor. When an automobile has been placed on the truck, the latter is turned so as to coincide lengthwise with the elevator platform which is shown as having a length considerably greater than its width. The elevator is then lifted to the desired floor and stopped in proper position for the truck to be moved off the elevator and along the alleyway as will be understood from Fig. 8. The operator by manipulating the switch 98 may cause the truck to move into position for discharging the automobile into any desired stall on either side of the alleyway. If there is an automobile waiting to be taken out on any of the floors of the building, the truck may be readily moved into alinement with the stall containing this automobile whereupon the truck and elevator are operated reversely to the operation just described.

I claim:

1. In an automobile storage building, a plurality of floors, an elevator, means for raising and lowering said elevator, a truck cooperating with said elevator, means for lifting said truck relatively to said elevator as the latter approaches its lowermost position, and means permitting said truck to be rotated when thus lifted.

2. In an automobile storage building, a plurality of floors, an elevator, means for raising and lowering said elevator, a truck adapted to be held in position upon said elevator, and means which releases said truck for rotation when said elevator approaches its lowermost position.

3. In an automobile storage building, a plurality of floors, an elevator, means for raising and lowering said elevator, a truck adapted to be held in position upon said elevator, said elevator having a member adapted to move vertically with relation to the main portion thereof, means for lifting said member relatively to said main member as said elevator approaches its lowermost position whereby said truck is also lifted, and means interposed between said member and said truck which permit the latter to be rotated when thus lifted.

4. In an automobile storage building, a plurality of floors, an elevator, means for raising and lowering said elevator, a truck adapted to be held in position upon said elevator, said elevator having a vertically movable section, a stop device for arresting the movement of said vertical section when said elevator approaches its lowermost position whereby said truck is lifted with relation to the main portion of said elevator, and means permitting said truck to be rotated when thus lifted.

5. In an automobile storage building, structure providing a central alleyway and a plurality of storage stands on each side of the alleyway, an elevator alined with the alleyway, a truck cooperating with the alleyway, means for lifting the truck relative to said elevator as the latter approaches its lowermost position, and pivoting means to keep the truck positioned relative to the elevator while the truck is rotated.

6. In combination, an elevator platform, a truck cooperating with the elevator platform, and pivot means to keep the truck positioned relative to the elevator while the truck is rotated.

7. In an automobile storage building, structure providing a central alleyway and a plurality of storage stands on each side of the alleyway, an elevator located in one end of the alleyway, an entrance passageway leading to the elevator, an exit passageway leading to the elevator at an angle from the entrance passageway, and a truck cooperating with the elevator and rotatable to aline with either the entrance passageway or with the exit passageway.

8. In an automobile storage building, structure providing a central alleyway and a plurality of storage stands on each side of the alleyway, an elevator located in one end of the alleyway, a room located in the end of the building in alinement with the elevator and on the side of the elevator opposite the alleyway, an entrance passage on one side of said room and leading to the elevator, an exit passage on the other side of the room and leading to the elevator at an angle from the entrance passage, and a truck cooperating with the elevator and rotatable to aline with either the entrance passageway or with the exit passageway.

In testimony whereof I hereunto affix my signature.

EDWIN M. WHEELOCK.